US011932452B2

(12) United States Patent
Fukuda

(10) Patent No.: US 11,932,452 B2
(45) Date of Patent: Mar. 19, 2024

(54) BAG WITH TEXT DISPLAY

(71) Applicant: SHARP KABUSHIKI KAISHA, Sakai (JP)

(72) Inventor: Keiichi Fukuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 282 days.

(21) Appl. No.: 17/047,635

(22) PCT Filed: Jan. 10, 2019

(86) PCT No.: PCT/JP2019/000448
§ 371 (c)(1),
(2) Date: Nov. 10, 2021

(87) PCT Pub. No.: WO2019/207846
PCT Pub. Date: Oct. 31, 2019

(65) Prior Publication Data

US 2022/0127046 A1 Apr. 28, 2022

(30) Foreign Application Priority Data

Apr. 27, 2018 (JP) ................................ 2018-086064

(51) Int. Cl.
*B28C 7/04* (2006.01)
*B65D 33/00* (2006.01)
*G01F 19/00* (2006.01)
*G09F 23/00* (2006.01)

(52) U.S. Cl.
CPC .......... *B65D 33/004* (2013.01); *G09F 23/00* (2013.01)

(58) Field of Classification Search
CPC ......... B65D 33/004; G09F 23/00; G09F 3/00; G09F 23/06
See application file for complete search history.

(56) References Cited

U.S. PATENT DOCUMENTS 5,863,431 A * 1/1999 Salzburg ................ A47J 31/08 D7/400
6,769,302 B1 8/2004 King et al.
7,553,083 B2 * 6/2009 Plourde ................ B65B 51/303 383/203
7,743,642 B2 * 6/2010 Chiba .................... B32B 27/32 73/29.04
8,893,416 B1 11/2014 Mckenzie
9,889,589 B1 * 2/2018 Pluemer ................ B29C 45/372
10,343,819 B2 * 7/2019 Schlarp ................ B65D 33/001
2007/0056871 A1 * 3/2007 Griffiths .................... A61J 1/14 206/459.1

(Continued)

FOREIGN PATENT DOCUMENTS

JP S51-85873 A 7/1976
JP H08-258887 A 10/1996

(Continued)

*Primary Examiner* — Shin H Kim
(74) *Attorney, Agent, or Firm* — ScienBiziP, P.C.

(57) ABSTRACT

The invention provides such a bag that a person can easily recognize the message text displayed thereon. A plastic bag (1) is a transparent or semi-transparent bag. The plastic bag (1) has warning message text (message) displayed on at least either an outside surface of the bag or an inside surface of the bag. The message text includes normal text (21) and mirror text (22) of the normal text (21).

9 Claims, 6 Drawing Sheets

(56) References Cited

U.S. PATENT DOCUMENTS

| | | | | |
|---|---|---|---|---|
| 2007/0253278 | A1* | 11/2007 | Dunlap | B01F 35/32021 366/19 |
| 2009/0013760 | A1* | 1/2009 | Chiba | B32B 27/32 73/29.04 |
| 2010/0148941 | A1* | 6/2010 | Haeselin | A44B 15/005 340/407.1 |
| 2011/0229059 | A1* | 9/2011 | Hanna | A61F 13/5512 383/1 |
| 2017/0183129 | A1* | 6/2017 | Schlarp | B65D 33/01 |
| 2017/0225862 | A1* | 8/2017 | Schnabel | B65D 25/54 |
| 2022/0127046 | A1* | 4/2022 | Fukuda | G09F 23/00 |
| 2022/0227408 | A1* | 7/2022 | Glimcher | G09F 23/0081 |

FOREIGN PATENT DOCUMENTS

| | | | |
|---|---|---|---|
| JP | H09-099955 | A | 4/1997 |
| JP | H11-100049 | A | 4/1999 |
| JP | 3068718 | U | 5/2000 |
| JP | 2006-347571 | A | 12/2006 |
| JP | 2009-062066 | A | 3/2009 |

* cited by examiner

BAG WITH TEXT DISPLAY

TECHNICAL FIELD

The present disclosure relates to bags with a text display.

BACKGROUND ART

Plastic bags are used for a wide range of purposes from carrying commercial goods purchased in convenience stores, supermarkets, and other retail stores, to packaging commercial goods for shipping, to keeping garbage and like articles. As an example, Patent Literature 1 discloses a plastic bag 3 used to cover a refrigerator (packaged article) 4 as a part of packaging for the refrigerator 4.

CITATION LIST

Patent Literature

Patent Literature 1: Japanese Unexamined Patent Application Publication, Tokukaihei, No. 8-258887

SUMMARY OF INVENTION

Technical Problem

Some such plastic bags have text printed on at least either the outside or inside surface thereof. Some such printed text contains a message related to the danger that may occur when the plastic bag is used (warning message text) for the purpose of ensuring user safety. For instance, a plastic bag that is used to package a large electric appliance such as a refrigerator may have printed thereon a warning message to avoid the risk of accidental suffocation that can occur when a person puts his/her head in the plastic bag.

The message text on the plastic bag is displayed in such an orientation that the message text appears in normal orientation ("normal text") in normal use condition that is appropriate for the intended purpose of the bag. If the user looks at the message text from a different direction than in normal use condition, the user will see the message text displayed in a different orientation than normal text (normal orientation text), so that it may become difficult for the user to instantly recognize the meaning of the message text.

Accordingly, the present invention, in an aspect thereof, has an object to provide such a bag that a person can easily recognize the message text displayed thereon.

Solution to Problem

The present invention, in an aspect thereof, is directed to a transparent or semi-transparent bag. The bag has warning message text displayed on at least either an outside surface of the bag or an inside surface of the bag. The message text includes normal text and mirror text.

The bag of this aspect of the present invention may be configured such that letting a direction in which a bottom of the bag and an opening of the bag are provided be a vertical direction, the normal text and the mirror text are displayed next to each other in a horizontal direction that crosses the vertical direction.

The bag of the aspect of the present invention may be configured such that the message text is printed on either the outside surface of the bag or the inside surface of the bag and that the message text is included in a print surface including: a first layer including the mirror text printed therein; a second layer on the first layer, the second layer including a non-transparent paint applied thereto; and a third layer on the second layer, the third layer including the normal text printed therein.

The bag of the aspect of the present invention may be configured such that the message text is displayed 10 cm or more from the bottom of the bag.

The bag of the aspect of the present invention may be configured such that the message text contains an instruction to refrain from hazardous behavior.

The bag of the aspect of the present invention may be configured such that the mirror text is in Hiragana characters or Katakana characters.

The bag of the aspect of the present invention may be configured so as to further have a warning symbol displayed on at least either the outside surface of the bag or the inside surface of the bag.

Advantageous Effects of Invention

As described so far, the present invention, in an aspect thereof, provides such a bag that a person can easily recognize the message text displayed thereon.

DESCRIPTION OF EMBODIMENTS

Figure 1:
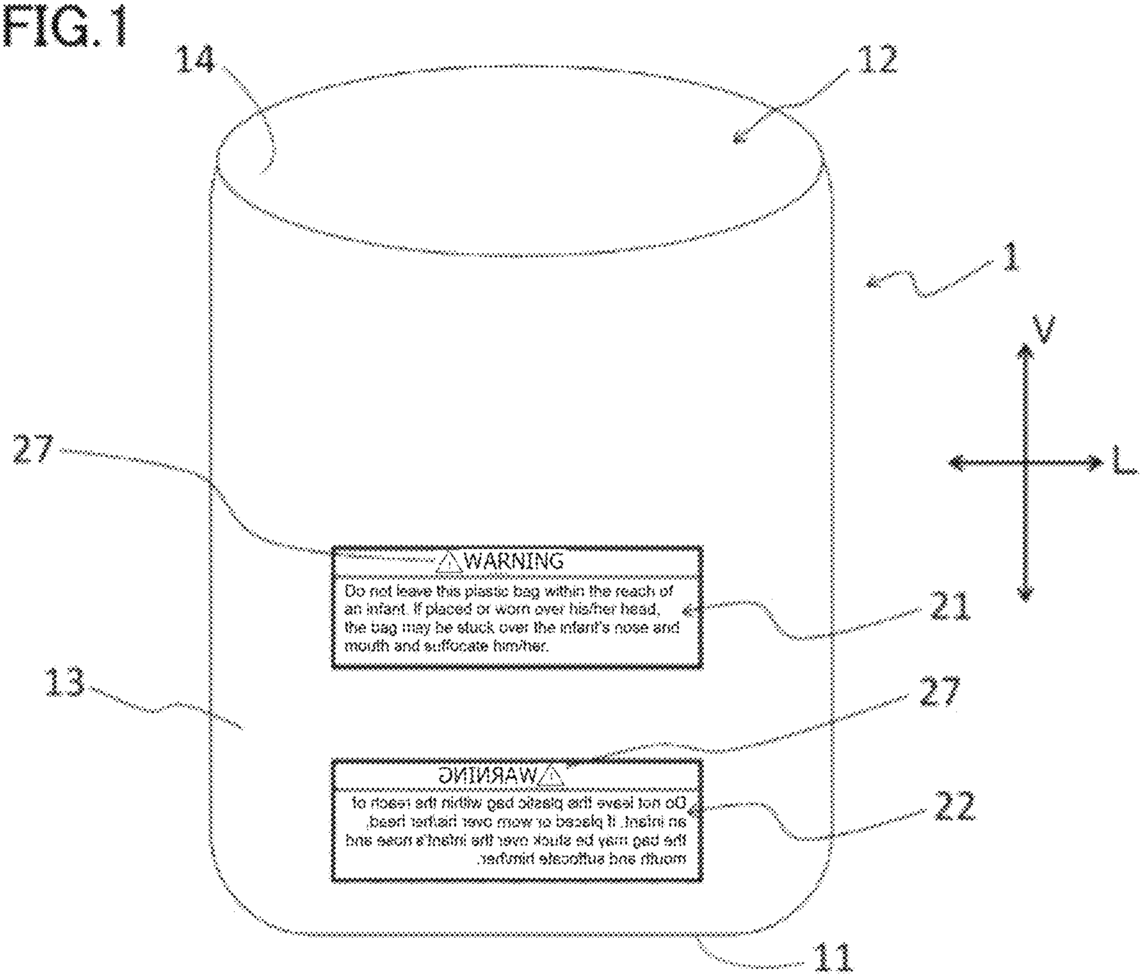
FIG. 1 is a perspective view of a plastic bag in accordance with an embodiment of the present invention.

The following will describe embodiments of the present invention with reference to drawings. Identical members are denoted by the same reference numerals throughout the following description. Such members are given the same names and have the same functionality, and description thereof is therefore not repeated.

First Embodiment

Overall Structure of Plastic Bag

The present embodiment will describe a plastic bag 1 as an example of a bag in accordance with the present invention. FIG. 1 shows the appearance of the plastic bag 1. The plastic bag 1 may be used to carry commercial goods purchased in convenience stores, supermarkets, and other retail stores, package commercial goods for shipping, and keep garbage and like articles. The plastic bag 1 is applicable to a bag that has a capacity of, for example, 20 liters or more.

The plastic bag 1 is made of a synthetic resin such as polyethylene or polypropylene. The plastic bag 1 is a transparent or semi-transparent bag-shaped article. “Transparent or semi-transparent” in this context indicates that when text, an image, or another object is printed on the outside or inside surface of a bag-shaped article, the object is visually recognizable not only on the print surface, but also on the reverse side of the print surface.

The plastic bag 1 has a single generally rectangular side face. An end of the single generally rectangular side face forms a bottom 11, and the other end thereof, opposite from the bottom 11, forms an opening 12. In other words, the plastic bag 1 is tubular and has one of the ends thereof open and the other end thereof sealed. For convenience in describing the structure of the plastic bag 1, the direction in which the bottom 11 and the opening 12 are formed will be referred to as vertical direction V (or the top-bottom direction) for the plastic bag 1, and the direction that crosses the vertical direction (at right angles) will be referred to as horizontal direction L (or the left-right direction) for the plastic bag 1. Additionally, the external surface of the plastic bag 1 will be referred to as an outside surface 13, and the internal surface thereof will be referred to as an inside surface 14.

There are displayed, for example, text 21 and 22 and symbols 27 on the outside surface 13 of the plastic bag 1. These text 21 and 22 and symbols 27 are, for example, printed on the outside surface 13 of the plastic bag 1. Since the plastic bag 1 is transparent or semi-transparent, the text 21 and 22 and symbols 27 may be printed on the inside surface 14 of the plastic bag 1 and may alternatively be printed on both the outside surface 13 and the inside surface 14 of the plastic bag 1.

The text 21 and 22 contains a message related to the danger that may occur when the plastic bag is used (warning message text). As an example, the plastic bag 1 shown in FIG. 1 displays a warning: “Do not leave this plastic bag within the reach of an infant. If placed or worn over his/her head, the bag may be stuck over the infant’s nose and mouth and suffocate him/her.”. The content of the messages may vary.

FIG. 1 shows the plastic bag 1 in an orientation in which the plastic bag 1 is used as originally intended. In other words, the plastic bag 1 shown in FIG. 1 is typically used with the opening 12 on top and the bottom 11 on the bottom.

In the present embodiment, the messages have the same content and are displayed in different types of text (specifically, the normal text 21 and the mirror text 22). The normal text 21 is a series of characters (or letters) displayed in such an orientation as to appear normal when the plastic bag 1 is viewed from the outside surface 13 side in normal use condition. The mirror text 22 is a series of characters (or letters) obtained by horizontally flipping the normal text 21. The mirror text 22 has the same top-bottom direction as the normal text 21. In other words, the mirror text 22 appears in normal text orientation when the mirror text 22 is viewed from the inside surface 14 side the plastic bag 1.

Since there is a message printed in the mirror text 22, the message is recognizable in normal text orientation from the inside surface 14 side of the plastic bag 1. When the plastic bag 1 is reversed inside out, the normal text 21 and the mirror text 22 are horizontally flipped, so that the mirror text 22 appears in normal orientation.

The symbol 27 may be, for example, a warning label or marking or a caution-invoking image. In the present embodiment, the symbols 27 are displayed in the same orientation for both the group of messages in the normal text 21 and the group of messages in the mirror text 22. Alternatively, there may be displayed a single symbol 27.

A description will be given next of other examples of the text and symbol(s) displayed on the plastic bag 1 with reference to FIGS. 2 and 3.

Figure 2:
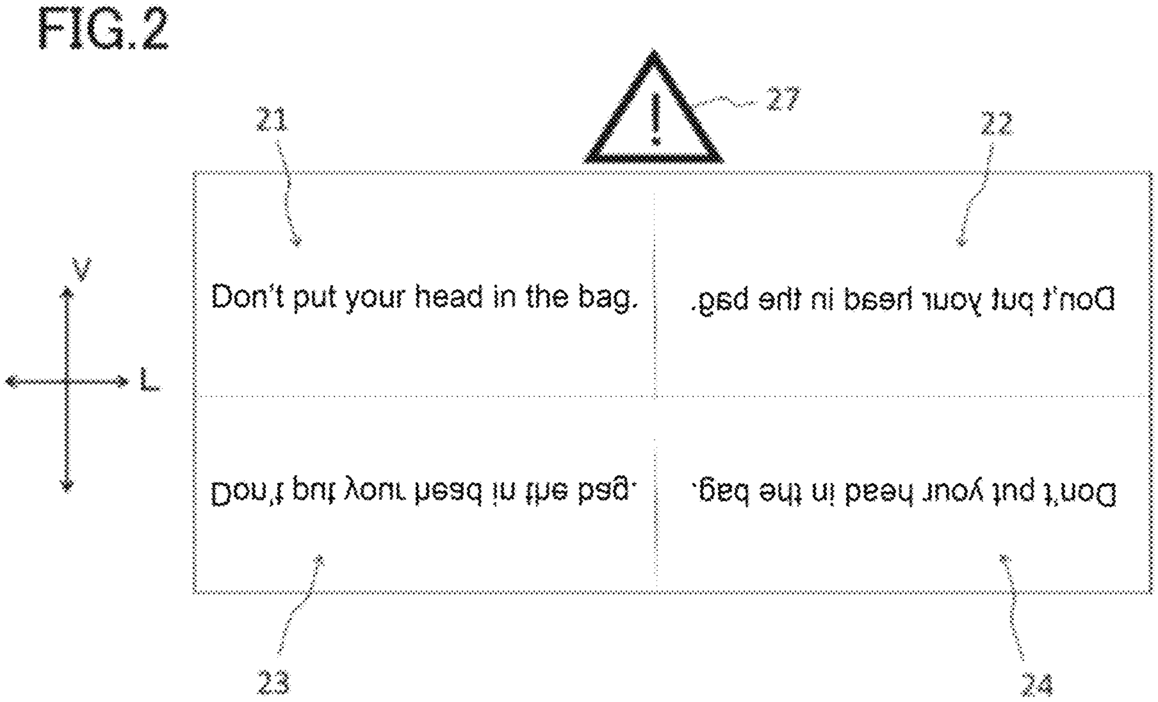
FIG. 2 is a schematic illustration of an exemplary symbol and text displayed on the plastic bag in accordance with the embodiment.

FIG. 2 shows an example where seven words, “Don’t put your head in the bag.”, are displayed as warning message text. A warning through such short, simple text is preferable because, for example, a little child can immediately understand the message when he/she has placed the plastic bag 1 over his/her head.

In the example shown in FIG. 2 are there displayed warning messages in the normal text 21 and in three types of mirror text 22, 23, and 24. The mirror text 22 is a series of characters obtained by horizontally flipping the normal text 21. The second mirror text 23 is a series of characters obtained by vertically flipping the normal text 21. The third mirror text 24 is a series of characters obtained by turning the normal text 21 around upside down (i.e., obtained by rotating the normal text 21 by 180°). In the present specification, mirror text may include text obtained by horizontally flipping normal text and additionally text obtained by vertically flipping normal text.

Since there are four types of text displayed each with a different orientation as described above, one of the four types of text is visually recognizable in normal text orientation when the plastic bag 1 is vertically flipped, when the plastic bag 1 is reversed inside out, and when the plastic bag 1 is both reversed inside out and vertically flipped.

In the example shown in FIG. 2, there is displayed a symbol 27. The only one symbol 27 is displayed for the four types of text 21, 22, 23, and 24 because the symbol 27 may be, for example, horizontally symmetric or so simple an image that a person can relatively instantly understand the meaning of the symbol 27 when the symbol 27 is vertically or horizontally flipped.

Figure 3:
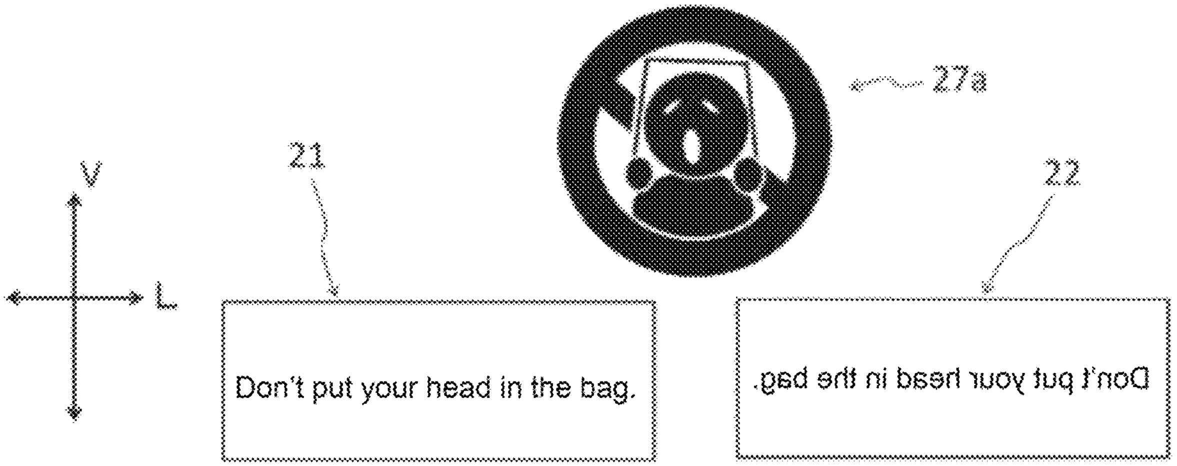
FIG. 3 is a schematic illustration of an exemplary symbol and text displayed on the plastic bag in accordance with the embodiment.

FIG. 3 shows an example where seven words, “Don’t put your head in the bag.”, are displayed in the normal text 21 and the mirror text 22 as warning message text. Referring to FIG. 3, the plastic bag 1 may display the normal text 21 and the mirror text 22 next to each other in horizontal direction L (the left-right direction) which crosses vertical direction V (the top-bottom direction) (at right angles).

When the messages are displayed in a language that is written horizontally from left to right (e.g., the English alphabet, Chinese characters, or Japanese Kana characters), the normal text 21 preferably appears on the left, and the mirror text 22 on the right because people generally start reading text written horizontally from left to right from the upper left. This arrangement places normal text in such a position that a person can easily catch the message in his/her line of sight both when the person looks at the plastic bag 1 from the outside surface 13 side and when the person looks at the plastic bag 1 from the inside surface 14 side.

By similar reasoning, the normal text preferably appears on the right, and the mirror text on the left when the messages are displayed in a language that is written horizontally from right to left (e.g., the Arabic alphabet, the Hebrew alphabet, or the Syriac alphabet).

When the normal text 21 and the three types of mirror text are displayed as in the example in FIG. 2, the normal text 21 preferably appears in the upper left, the mirror text 22 in the upper right, the second mirror text 23 in the lower left, and the third mirror text 24 in the lower right when the plastic bag 1 is viewed from the outside surface 13 side in normal use condition. This arrangement places normal text in the upper left position regardless of whether a person looks at the plastic bag 1 upside down, inside out, or both upside down and inside out.

In the example shown in FIG. 3 is there displayed a single symbol 27*a* as a symbol sending a message that prohibits a person from placing the plastic bag 1 over his/her head. The symbol 27*a* is displayed in the same orientation as the normal text 21 because a person can recognize the symbol 27*a* more easily than text even when the symbol 27*a* is flipped. Alternatively, there may be displayed two or more symbols in various, different orientations in other examples.

Variation Examples

Figure 4:
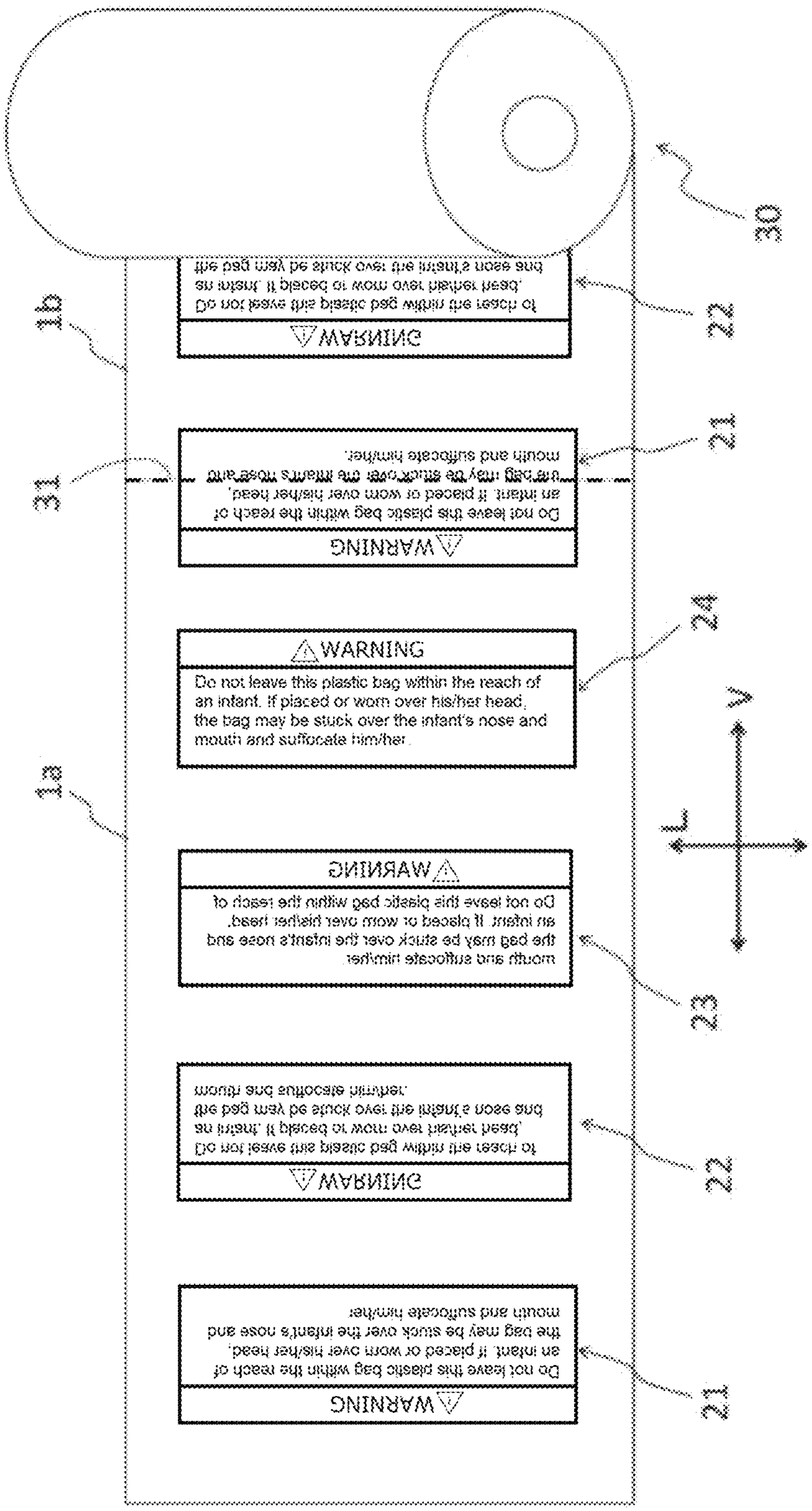
FIG. 4 is a schematic illustration of an aggregate of plastic bags (roll of plastic bags).

FIG. 4 shows a roll of plastic bags (aggregate of plastic bags) 30 that is a variation example of the plastic bag 1. The roll of plastic bags 30 is a structural body including a roll of plastic bags 1*a*, 1*b*, . . . . There are formed perforations 31 along the boundaries of the plastic bags, so that each plastic bag can be readily separated from the roll. In each plastic bag 1*a*, 1*b*, . . . , the rotation direction of the roll body matches vertical direction V. An end of each plastic bag 1*a*, 1*b*, . . . with respect to this vertical direction V forms an opening 12, and the other end thereof forms a bottom 11 (sealed portion). In the example in FIG. 4, the bottom end of each plastic bag 1*a*, 1*b*, . . . forms the opening 12, and the top end forms the bottom 11 (sealed portion).

The roll of plastic bags 30 displays, for example, on the outside surface thereof, messages related to the danger that may occur when the plastic bag is used (warning message text). These messages are displayed in the normal text 21 and the three types of mirror text 22, 23, and 24, as in the case with the plastic bag 1. Each message includes a symbol.

The messages displayed in the normal text 21 and the three types of mirror text 22, 23, and 24 are displayed next to each other in vertical direction V on the roll of plastic bags 30. It is preferable to specify the positions and sizes of the messages in such a manner that each plastic bag 1*a*, 1*b*, . . . , which will be separated when used, contains all the normal text 21 and the three types of mirror text 22, 23, and 24.

The plastic bag 1*a*, 1*b*, . . . in the roll of plastic bags 30 is used, for example, to package a large-sized article such as a refrigerator or a washing machine. When the plastic bag 1*a*, 1*b*, . . . is used in packaging such a large-sized article, the plastic bag 1*a*, 1*b*, . . . is often used by being placed over the article. When the plastic bag 1*a*, 1*b*, . . . is placed over the article, a person will recognize, as normal text, the third mirror text 24 which is text obtained by turning the normal text 21 around upside down (i.e., obtained by rotating the normal text 21 by 180°).

If, for example, the plastic bag 1*a*, 1*b*, . . . is placed over an article after being reversed inside out, a person will recognize, as normal text, the second mirror text 23 which is text obtained by vertically flipping the normal text 21.

Since the messages are displayed in the normal text 21 and the three types of mirror text 22, 23, and 24 as described here, one of the messages always appears in normal text orientation even if the plastic bag 1*a*, 1*b*, . . . is, for example, vertically flipped or reversed inside out when used.

Summation of First Embodiment

The plastic bag 1 in accordance with the present embodiment is made of a transparent or semi-transparent material. The plastic bag 1 displays warning message text (message) on at least either the outside surface 13 or the inside surface 14 thereof. Since the plastic bag 1 is made of a transparent or semi-transparent material, for example, the text printed on the outside surface 13 is visually recognizable also on the inside surface 14, and conversely, the text printed on the inside surface 14 is visually recognizable also on the outside surface 13.

The message text displayed on at least either the outside surface 13 or the inside surface 14 includes the normal text 21 and the mirror text 22 of this normal text 21. The normal text 21 and the mirror text 22 may be made up of the same group of characters or different groups of characters. A person recognizes the normal text 21 as normal orientation text when he/she looks at the plastic bag 1 from the outside surface 13 side and recognizes the mirror text 22 as normal orientation text when he/she looks at the plastic bag 1 from the inside surface 14 side.

This display of message text in both normal text and mirror text enables a person to more easily recognize the displayed message text from outside the plastic bag and from inside the plastic bag.

The message text displayed on the plastic bag 1 may contain the second mirror text 23 and the third mirror text 24 in addition to the mirror text 22. This arrangement enables a person to recognize the message text as normal orientation text even if the plastic bag 1 is used upside down when compared with normal use condition.

Second Embodiment

Figure 5:
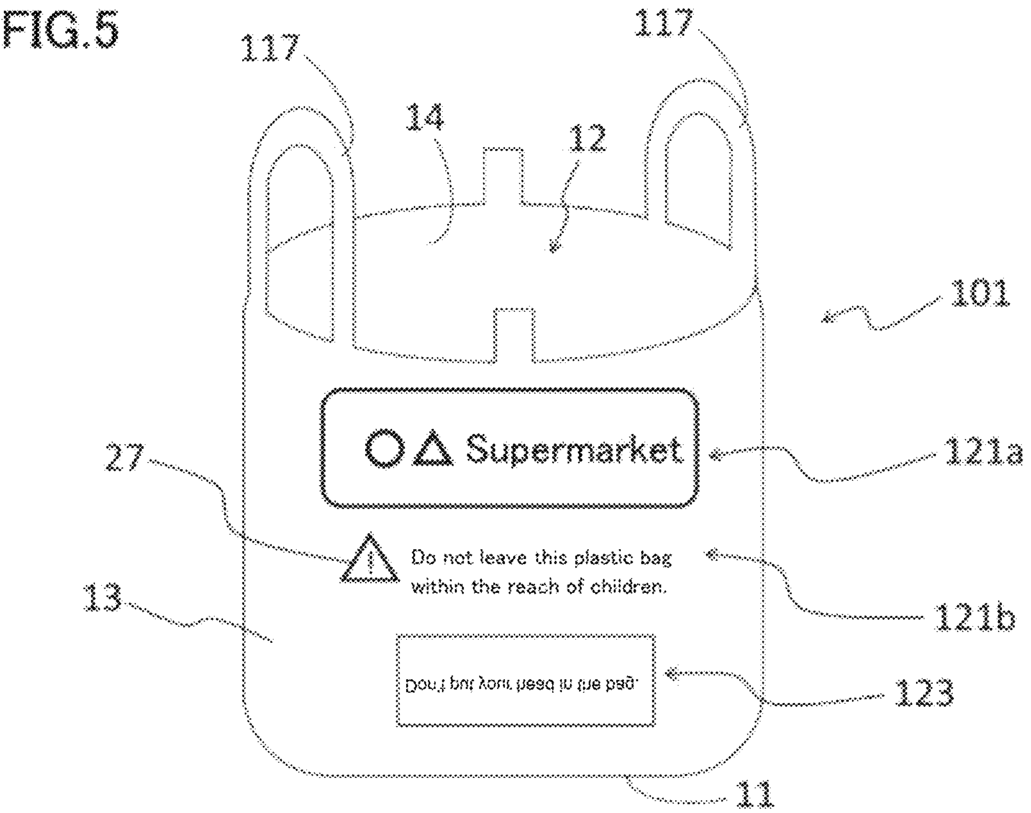
FIG. 5 is a perspective view of a plastic bag in accordance with a second embodiment.

A description will be given next of a second embodiment of the present invention. FIG. 5 shows an external structure of a plastic bag 101 in accordance with the second embodiment. The plastic bag 101 may be suitably used to carry commercial goods purchased in convenience stores, supermarkets, and other retail stores. The plastic bag 101 approximately has a sufficient capacity to be placed over, for example, a person's head (e.g., 10 liters or more).

Similarly to the first embodiment, the plastic bag 101 is made of a synthetic resin such as polyethylene or polypropylene. The plastic bag 101 is a transparent or semi-transparent bag-shaped article. The plastic bag 101 has a generally tubular external shape. An end of the tubular body forms a bottom (sealed portion) 11, and the other end thereof, opposite from the bottom 11, forms an opening 12. The plastic bag 101 has handles 117 on the opening 12.

The plastic bag 101 has some text 121*a*, 121*b*, and 123 and a symbol 27 printed on the outside surface 13 thereof. Since the plastic bag 101 is made of a transparent or semi-transparent material, the text printed on the outside surface 13 is visually recognizable also on the inside surface 14.

The text 121*a* may contain the name and logo of the retail store. The text 121*b* contains a message related to the danger that may occur when the plastic bag is used (warning message text). As an example, the plastic bag 101 shown in FIG. 5 displays a warning: "Do not leave this plastic bag within the reach of children.". The text 121*a* and 121*b* is displayed in text that appears in normal orientation when the plastic bag 101 is viewed in normal use condition (e.g., displayed in normal text).

The symbol 27 is displayed next to the text 121*b*. The second mirror text 123 is displayed below the text 121*b* (closer to the bottom 11). The second mirror text 123 contains a message related to the danger that may occur when the plastic bag is used (warning message text). As an example, the plastic bag 101 shown in FIG. 5 displays a warning: "Don't put your head in the bag.". The second mirror text 123 is displayed in text that has the same orientation as the second mirror text 23 in the first embodiment. In other words, the second mirror text 123 is a series of characters obtained by vertically flipping the text that appears in normal orientation when the plastic bag 101 is viewed in normal use condition (that is, obtained by vertically flipping normal text).

As described so far, the plastic bag 101 in accordance with the present embodiment displays two types of warning message-containing text. One of the messages is displayed in the normal text 121*b*, and the other message is displayed in the second mirror text 123. Different text is displayed in the normal text 121*b* and the second mirror text 123. The normal text 121*b* and the second mirror text 123 may not include the same text as described here.

The normal text 121*b* displayed on the plastic bag 101 is recognizable as normal text when the plastic bag 101 is viewed from the outside surface 13 side in normal use condition. When the plastic bag 101 is viewed from the outside surface 13 side in normal use condition, the warning message directed to a person who uses the plastic bag 101 (specifically, "Do not leave this plastic bag within the reach of children.") is recognized as normal text.

Meanwhile, the second mirror text 123 displayed on the plastic bag 101 is recognized as normal text if the plastic bag 101 is turned upside down when compared with normal use condition and is viewed from the inside surface 14 side. Therefore, if, for example, a child accidentally places the plastic bag 101 over his/her head, he/she can recognize, as normal text, the content, "Don't put your head in the bag.", printed as the second mirror text 123.

As could be understood here, the message displayed in the second mirror text 123 is preferably in simple words so that children can understand the message. A shorter and simpler message is also preferred so that the person having placed the plastic bag 101 over his/her head can more quickly understand the message.

For instance, the message displayed in the second mirror text 123 may contain an instruction (order), for example, "Don't put your head in the bag,", "Remove (the plastic bag).", or "Take off (the plastic bag).", to refrain from hazardous behavior of putting a plastic bag over one's head. This arrangement sends a strong message to the person having placed the plastic bag 101 over his/her head.

Third Embodiment

Figure 6:
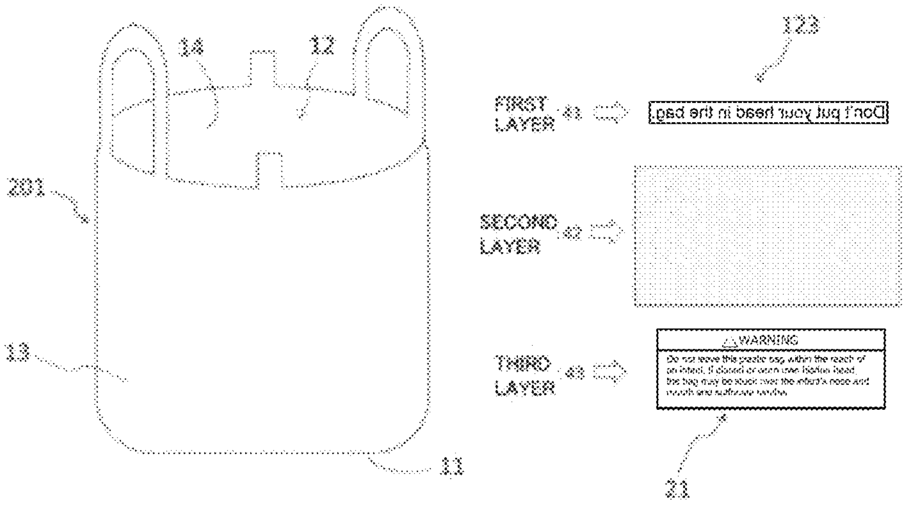
FIG. 6 is a schematic illustration of how, for example, text is printed on a plastic bag in accordance with a third embodiment.
Figure 7:
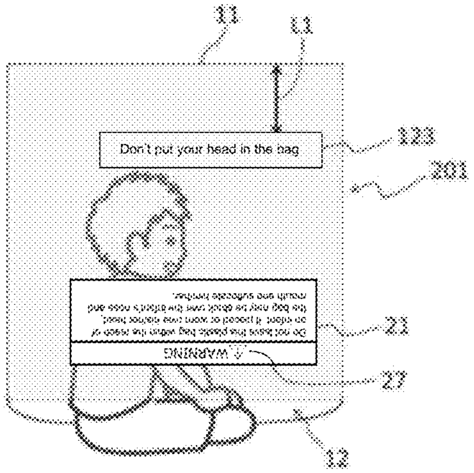
FIG. 7 is a schematic illustration of a child having placed the plastic bag in accordance with the third embodiment over his/her head.

A description will be given next of a third embodiment of the present invention with reference to FIGS. 6 and 7. FIG. 6 shows how, for example, text and a symbol are printed on the outside surface 13 of a plastic bag 201 in accordance with the third embodiment. FIG. 7 is a schematic illustration of a child having placed the plastic bag 201 in accordance with the third embodiment over his/her head.

The plastic bag 201 has a shape similar to that of the plastic bag 101 of the second embodiment. The plastic bag 201 approximately has a sufficient capacity to be placed over, for example, a person's head (e.g., 10 liters or more).

The plastic bag 201 has, for example, normal text 21 and second mirror text 123 printed on the outside surface 13 thereof. The plastic bag 201 has on the outside surface 13 a print surface that has a three-layer structure including a first layer 41, a second layer 42, and a third layer 43. The first layer 41 includes the second mirror text (mirror text) 123 printed therein. The second layer 42 is disposed on the first layer 41. The second layer 42 includes a non-transparent paint (e.g., white paint) applied thereto. The third layer 43 is disposed on the second layer 42. The third layer 43 includes the normal text 21 printed therein.

Since the plastic bag 201 has the print surface structured as above, only the normal text 21 is visually recognizable when the plastic bag 201 is viewed from the outside surface 13 side, and only the second mirror text 123 is visually recognizable when the plastic bag 201 is viewed from the inside surface 14 side.

For instance, the normal text 21, similarly to the normal text 21 of the first embodiment, has content: "Do not leave this plastic bag within the reach of an infant. If placed or worn over his/her head, the bag may be stuck over the infant's nose and mouth and suffocate him/her.".

The second mirror text 123 is displayed in the same text orientation as the second mirror text 23 of the first embodiment. In other words, the second mirror text 123 is obtained by vertically flipping the text that appears in normal orientation when the plastic bag 201 is viewed in normal use condition. The second mirror text 123 has content, for example, "Don't put your head in the bag.", similarly to the second embodiment. FIG. 7 shows the second mirror text 123 in a text orientation in which the second mirror text 123 appears when the plastic bag 201 is viewed from the inside surface 14 side thereof.

FIG. 7 illustrates a child having placed the plastic bag 201 over his/her head. The child inside the plastic bag 201 can recognize the second mirror text 123 as normal text. The second mirror text 123 is disposed in a location separated by distance L1 from the bottom 11 of the plastic bag 201. L1 is preferably 10 cm or more. The disposition of the second mirror text 123 in such a location prevents the mirror text 123 from being positioned above the eyes of an adult or child having placed the plastic bag 201 over his/her head, thereby ensuring that the adult or child having placed the plastic bag 201 over his/her head can recognize the second mirror text 123.

Distance L1 by which the plastic bag 201 is separated from the bottom 11 is preferably 40 cm or less. This structure prevents the mirror text 123 from being positioned below the eyes (e.g., below the shoulders) of the adult or child having placed the plastic bag 201 over his/her head, thereby ensuring that the adult or child having placed the plastic bag 201 over his/her head can recognize the second mirror text 123.

As described here, by limiting the location of the mirror text 123 to within a range specified using distance L1 by which the plastic bag 201 is separated from the bottom 11, the second mirror text 123 is positioned at substantially the same height as the eyes of the adult or child having placed the plastic bag 201 over his/her head, which renders the second mirror text 123 more readily recognizable.

To form a print surface with the three-layer structure described above, the second mirror text 123 may be first printed as the first layer 41, a non-transparent background color such as white may be then applied next as the second layer 42, and the normal text 21 may be finally printed as the third layer 43. This method enables one-sided printing of two types of text, one being visually recognizable when viewed on the outside surface 13 of the plastic bag 201 and the other being visually recognizable when viewed on the inside surface 14 of the plastic bag 201. Such one-sided printing restrains the paint used in the printing from being transferred to the packaged article if the surface on which no text is printed (e.g., the inside surface 14) serves as a contact surface for the packaged article.

The foregoing description gives an example where the second mirror text 123 is printed in the first layer 41.

Alternatively, the other mirror text described in the first embodiment may be printed in the first layer 41. As another alternative, the plural types of mirror text described in the first embodiment may be printed in the first layer 41.

Fourth Embodiment

Figure 8:
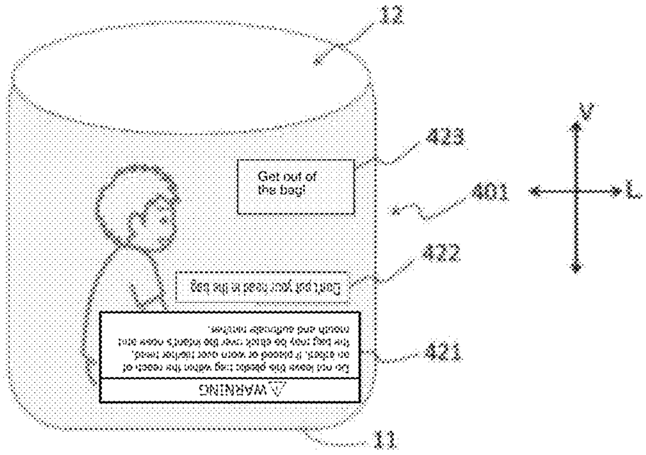
FIG. 8 is a schematic illustration of a child who is inside a plastic bag in accordance with a fourth embodiment.

A description will be given next of a fourth embodiment of the present invention with reference to FIG. 8. FIG. 8 shows an external structure of a plastic bag 401 in accordance with the fourth embodiment. The plastic bag 401 is used, for example, to package a large-sized article such as a refrigerator or a washing machine. The plastic bag 401 therefore has a greater capacity than the plastic bag 101.

The plastic bag 401 is used typically by being placed over the article to be packaged. FIG. 8 shows the plastic bag 401 upside down when compared with normal use condition. Similarly to, for example, the plastic bag 1 of the first embodiment, an end of the plastic bag 401 with respect to vertical direction V forms an opening 12, and the other end thereof forms a bottom 11.

The plastic bag 401 has, for example, normal text 421, a symbol, mirror text 422, and second mirror text 423 displayed on the outside surface 13. These text and symbol are printed, for example, on the outside surface 13 of the plastic bag 401. Similarly to the third embodiment, the plastic bag 401 may have on the outside surface 13 thereof a print surface that has a three-layer structure. In such cases, the mirror text 422 and the second mirror text 423 are printed in the first layer 41, and the normal text 421 is printed in the third layer 43.

The normal text 421 contains a message related to the danger that may occur when the plastic bag is used (warning message text). As an example, the plastic bag 401 shown in FIG. 8 displays a warning of the same content as the normal text 21 displayed on the plastic bag 1 in the first embodiment. The normal text 421 is displayed in text that appears in normal orientation when the plastic bag 401 is viewed in normal use condition (e.g., displayed in normal text).

The mirror text 422 is displayed closer to the opening 12 than is the normal text 421 (above the normal text 421 in FIG. 8). Similarly to the second mirror text 123 of the third embodiment, the mirror text 422 contains an instruction message to refrain from hazardous behavior that involves use of the plastic bag. For instance, the plastic bag 401 shown in FIG. 8 displays an instruction message, "Don't put your head in the bag.", to refrain from placing or wearing the plastic bag 401 over one's head. The mirror text 422 is displayed in text that has the same orientation as the mirror text 22 of the first embodiment. In other words, the mirror text 422 is a series of characters obtained by horizontally flipping the text that appears in normal orientation when the plastic bag 401 is viewed in normal use condition. FIG. 8 shows the mirror text 422 in an orientation in which the mirror text 422 appears when the plastic bag 401 is viewed from the inside surface 14 side.

The second mirror text 423 is displayed even closer to the opening 12 of the plastic bag 401. The second mirror text 423 contains an instruction message to refrain from hazardous behavior that involves use of the plastic bag. For instance, the plastic bag 401 shown in FIG. 8 displays an instruction message, "Get out of the bag!", to refrain from moving completely into the plastic bag 401. The second mirror text 423 is displayed in text that has the same orientation as the second mirror text 23 of the first embodiment. In other words, the second mirror text 423 is a series of characters obtained by vertically flipping the text that appears in normal orientation when the plastic bag 401 is viewed in normal use condition. FIG. 8 shows the second mirror text 423 in an orientation in which the second mirror text 423 appears when the plastic bag 401 is viewed from the inside surface 14 side.

FIG. 8 shows a child who has moved into the plastic bag 401. The child's face is likely to be positioned close to the opening 12 of the plastic bag 401 in such a condition. The plastic bag 401 therefore displays an instruction message, "Get out of the bag!", in the second mirror text 423 in such a manner that the instruction message is visually recognized as normal text when viewed from inside the plastic bag 401 with the opening 12 of the plastic bag 401 being positioned upward. As could be understood from the example in FIG. 8, the second mirror text 423 is preferably in simple words so that little children can understand the meaning.

If a child has placed the plastic bag 401 over his/her head, the child's face is likely to be positioned close to the bottom 11 of the plastic bag 401. The plastic bag 401 therefore displays an instruction message, "Don't put your head in the bag.", in the mirror text 422 in such a manner that the instruction message is visually recognized as normal text when viewed from inside the plastic bag 401 with the bottom 11 of the plastic bag 401 being positioned upward.

As described so far, the plastic bag 401 in accordance with the present embodiment displays messages of different content in different locations to suit the hazardous behavior that may occur when the plastic bag 401 is used. The user can hence more easily recognize a message that suits the usage of the plastic bag 401 and more likely to refrain from hazardous behavior that may occur when the plastic bag 401 is used.

Fifth Embodiment

Figure 9:
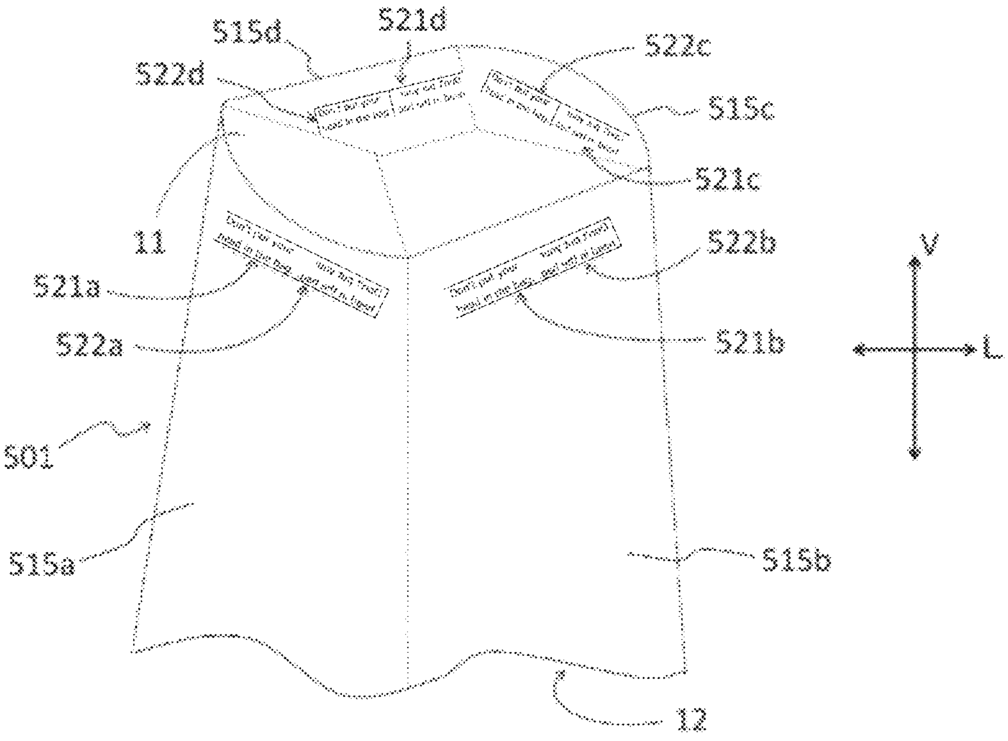
FIG. 9 is a perspective view of a plastic bag in accordance with a fifth embodiment.

A description will be given next of a fifth embodiment in accordance with the present invention with reference to FIG. 9. FIG. 9 shows an external structure of a plastic bag 501 in accordance with the fifth embodiment. The plastic bag 501 is used, for example, to package a large-sized article such as a refrigerator or a washing machine. The plastic bag 501 therefore has a greater capacity than the plastic bag 101.

The plastic bag 501 is used typically by being placed over the article to be packaged. FIG. 9 shows the plastic bag 501 in normal use condition. Similarly to, for example, the plastic bag 1 of the first embodiment, an end of the plastic bag 501 with respect to vertical direction V forms an opening 12, and the other end thereof forms a bottom 11.

Referring to FIG. 9, the plastic bag 501 is so structured that the bottom 11 can expand into a generally rectangular shape. This structure enables the plastic bag 501 to have a three-dimensional shape and hence exhibit a greater article packaging capacity. The plastic bag 501 has four side faces: a first side face 515*a*, a second side face 515*b*, a third side face 515*c*, and a fourth side face 515*d*.

Each side face 515*a*, 515*b*, 515*d*, and 515*d* displays four Hiragana characters, "Don't put your head in the bag.", as warning message text. In the example in FIG. 9, each side face displays a warning message in normal text and another warning message in mirror text.

Specifically, the first side face 515*a* displays normal text 521*a* and mirror text 522*a*. The second side face 515*b* displays normal text 521*b* and mirror text 522*b*. The third side face 515*c* displays normal text 521*c* and mirror text 522*c*. The fourth side face 515*d* displays normal text 521*d* and mirror text 522*d*.

This structure where the plastic bag 501 displays a warning message not only on one of the side faces thereof, but also on the other side faces thereof, enables a person to visually recognize the warning message displayed on any of the side faces when he/she has placed the plastic bag 501 over his/her head. In the example in FIG. 9, all the side faces (specifically, the four side faces) of the plastic bag 501 display a warning message. This is however not the only possible implementation of the invention. A warning message is preferably displayed on at least two of the side faces and more preferably displayed all around the plastic bag.

The embodiments and examples disclosed herein are for illustrative purposes only in every respect and provide no basis for restrictive interpretations. The scope of the present invention is defined only by the claims and never bound by the foregoing description. Those modifications and variations that may lead to equivalents of claimed elements are all included within the scope of the invention. Structures obtained from combinations of structures disclosed in different embodiments of the present specification described above are also included within the scope of the present invention.

REFERENCE SIGNS LIST

1 Plastic Bag (Bag)
11 Bottom
12 Opening
13 Outside Surface
14 Inside Surface
21 Normal Text
22 Mirror Text
23 Second Mirror Text
24 Third Mirror Text
27 Symbol
30 Roll of Plastic Bags
41 First Layer
42 Second Layer
43 Third Layer
101 Plastic Bag (Bag)
201 Plastic Bag (Bag)
401 Plastic Bag (Bag)
501 Plastic Bag (Bag)

The invention claimed is:

1. A transparent or semi-transparent bag having a warning message text displayed on at least one of an outside surface of the bag or an inside surface of the bag, the message text comprising a normal text and a mirror text, wherein the message text is printed on either the outside surface of the bag or the inside surface of the bag, and the message text is included in a print surface comprising:

a first layer including the mirror text printed therein;

a second layer on the first layer, the second layer including a non-transparent paint applied thereto; and a third layer on the second layer, the third layer including the normal text printed therein.

2. The bag according to claim 1, wherein the mirror text includes a first mirror text comprising a series of characters obtained by horizontally flipping the normal text, a second mirror text comprising a series of characters obtained by vertically flipping the normal text, and a third mirror text comprising a series of characters obtained by rotating the normal text by 180°.

3. The bag according to claim 1, wherein letting a direction in which a bottom of the bag and an opening of the bag are provided be a vertical direction, the normal text and the mirror text are displayed next to each other in a horizontal direction that crosses the vertical direction.

4. The bag according to claim 1, wherein the message text is displayed 10 cm or more from a bottom of the bag.

5. The bag according to claim 1, wherein the message text comprises an instruction to refrain from hazardous behavior.

6. The bag according to claim 1, wherein the mirror text is in Hiragana characters or Katakana characters.

7. The bag according to claim 1, further having a warning symbol displayed on at least one of the outside surface of the bag or the inside surface of the bag.

8. The bag according to claim 2, wherein the message text includes a language that is written horizontally from either left to right or from right to left, and the message text is displayed side by side in a horizontal direction, such that the normal text is arranged on one side and the first mirror text is arranged on another side.

9. The bag according to claim 2, wherein the message text is displayed in a vertical direction, such that the normal text is arranged on an upper side and the second mirror text is arranged on a lower side.

* * * * *